US007911639B2

(12) United States Patent
Hara

(10) Patent No.: US 7,911,639 B2
(45) Date of Patent: Mar. 22, 2011

(54) IMAGE FORMING DEVICE

(75) Inventor: Hiroyuki Hara, Osaka (JP)

(73) Assignee: Kyocera Mita Corporation, Osaka-shi (JP)

( * ) Notice: Subject to any disclaimer, the term of this patent is extended or adjusted under 35 U.S.C. 154(b) by 985 days.

(21) Appl. No.: 11/801,552

(22) Filed: May 10, 2007

(65) Prior Publication Data

US 2008/0005388 A1 Jan. 3, 2008

(30) Foreign Application Priority Data

May 12, 2006 (JP) ................................. 2006-133649

(51) Int. Cl.
*G06K 15/00* (2006.01)
*G06F 3/12* (2006.01)
(52) U.S. Cl. .................... 358/1.16; 358/1.1; 358/1.13
(58) Field of Classification Search ................... 358/1.1, 358/1.2, 1.4, 1.5, 1.6, 1.9, 1.11, 1.12, 1.13, 358/1.14, 1.15, 1.16, 1.17, 1.18
See application file for complete search history.

(56) References Cited

U.S. PATENT DOCUMENTS

| 2002/0054326 A1 | 5/2002 | Morita |
| 2006/0158675 A1 | 7/2006 | Morita |
| 2006/0164670 A1 | 7/2006 | Morita |

FOREIGN PATENT DOCUMENTS

| JP | 2002 84383 | 3/2002 |
| JP | 2003 248626 | 9/2003 |

*Primary Examiner* — Thierry L Pham

(57) ABSTRACT

A method that enables an image forming device of efficient memory sharing between processes and a kernel in a simple multiple-process-configuration. The image forming device has a real address space including a DMA buffer area and a shared memory area, a virtual address spaces, and job page assurance (JPA) programs. The virtual address spaces of the executing processes are mapped onto the real address space. The DMA buffer area can be accessed by the kernel. The shared memory area stores a job list and a job management list. The processes in the virtual address spaces include identical JPA libraries. Each of the JPA libraries requests the kernel to allocate of one page non-compressed data memory size for the job in the DMA buffer area, and upon completion of the job output, requests the kernel to release the allocated area and alters the contents in the job management list accordingly.

10 Claims, 7 Drawing Sheets

IMAGE FORMING DEVICE

FIELD OF THE INVENTION

The present invention relates to an image forming device which maps a virtual address space of a process for each job onto a real address space to execute multiple jobs, and more particularly, to an image forming device which manages a shared memory.

BACKGROUND OF THE INVENTION

This type of image forming device is equipped with an OS (operating system) capable of processing multiple tasks for parallel-processing a plurality of functions, such as copying, printing, scanning, and facsimile transmission with a single MPU (microprocessor unit). A kernel space of the OS differs from a process space, and each of multiple process spaces also differs from one another, so that the access to a space from another can not be performed. Therefore, in order to access data in a space from another space, the data has to be copied from the space onto the other prior to accessing.

Japanese Patent Application Laid-Open No. 2003-248626 discloses a configuration of a memory management unit of an image forming device, which allocates a single physical memory area for an area in a kernel space that a USB (universal serial bus) device driver uses and an area in a process space that a USB interface module of the process uses.

However, the aforementioned patent application document does not disclose on memory sharing by processes and a kernel in a multiple process configuration. In a multiple process configuration according to the document thereof, the kernel responds to a memory allocation request or a memory release request by a process. Therefore, if each process arbitrarily requests for memory allocation, the memory allocation increases job wait and hinders an efficient execution of multiple jobs.

Alternatively, a method disclosed in Japanese Patent Application Laid-Open No. 2002-084383 for providing a middleware which mediates memory allocation requests from each job in between an OS and an application, i.e., expanding the platform. This method makes it impossible to use existing software assets and complicates the configuration of a memory management unit of an image forming device by adding an extra layer.

An object of the present invention is to address such issues by providing an image forming device of a simple configuration which enables efficient memory sharing between processes and a kernel in a multiple processes configuration.

SUMMARY OF THE INVENTION

The present invention addresses the abovementioned issues by implementing a job page assurance (hereinafter "JPA") library on a process in a virtual address space.

In a first aspect of the present invention, an image forming device has a processor, multiple image input units connected to the processor, and a storing unit connected to the processor and embodying virtual address spaces and a real address space. An operating system that executes multiple jobs by mapping, a virtual address space of a process of each job onto a real address space and executes multiple jobs is stored in the storing unit, the image forming device, comprising: the real address space includes the first shared area onto which data area in each virtual address space of an executing process is mapped and to which a kernel of the operating system can make access, and a second shared area where state information of each executing job and area allocation status information of each executing job in the first shared area are stored.

Processes in the virtual address spaces have identical JPA programs. The JPA program includes a step (a) based on the state information and the area allocation status information of each job, of determining allocation of one page memory size of non-compressed data in the first shared area for the job is allocated, a step (b) of requesting the kernel to allocate the area of the size and altering the area allocation status information, and a step (c), in response to a job output completion report, of requesting the kernel to release the allocated area for the job in the first shared area and altering the area allocation status information.

In a second aspect of an image forming device of the present invention according to the aforementioned aspect, the first shared area is a direct memory access buffer area in a kernel address space.

According to a configuration of the first aspect of the present invention, the real address space that is mapped with data area in each virtual address space of an executing process and that includes the first shared area onto which data area in each virtual address space of an executing process is mapped and to which a kernel of the operating system can make access, to be accessed by a kernel of the operating system, and the a second shared area where a state information of each executing job and an area acquisition allocation status information of each executing job in the first shared area for each executing job are stored.

Processes in the each virtual address spaces whose processes have identical JPA programs. The JPA program includes a step (a) which, based on the state information and the area acquisition allocation status information of each job, of determining a memory size of an area to which allocation of one page of non-compressed data memory size for the job is allocated, which is to be a step (b) of requesting to the kernel, then requests the kernel for the allocation of the size to allocate the area of the size and altering the area acquisition allocation status information, and a step (c), in as a response to a job output completion report, of requesting the kernel to release the acquired allocated area for the job in the first shared area for the job and altering the area acquisition allocation status information.

Accordingly, the preferred embodiments of the present invention realize a simple configuration without a middleware and efficient memory sharing between processes and a kernel in a multiple processes configuration.

According to the second aspect of the present invention, the first shared area is a direct memory access buffer area in the kernel address space. Accordingly, image data input in the kernel address space by direct memory access can be processed in each process without copying image data to the process space.

These and other objects, embodiments and advantages of the present invention are specifically set forth in or will become apparent from the following detailed descriptions of the invention when read in conjunction with the accompanying drawings.

DETAILED DESCRIPTION OF THE INVENTION

Exemplary embodiments of the present invention are explained below with reference to the accompanying drawings though these embodiments are not intended to limit the invention. Additionally, in some instances, well-known structures, interfaces, and processes have not been shown in detail in order not to unnecessarily obscure the present invention.

Figure 1:
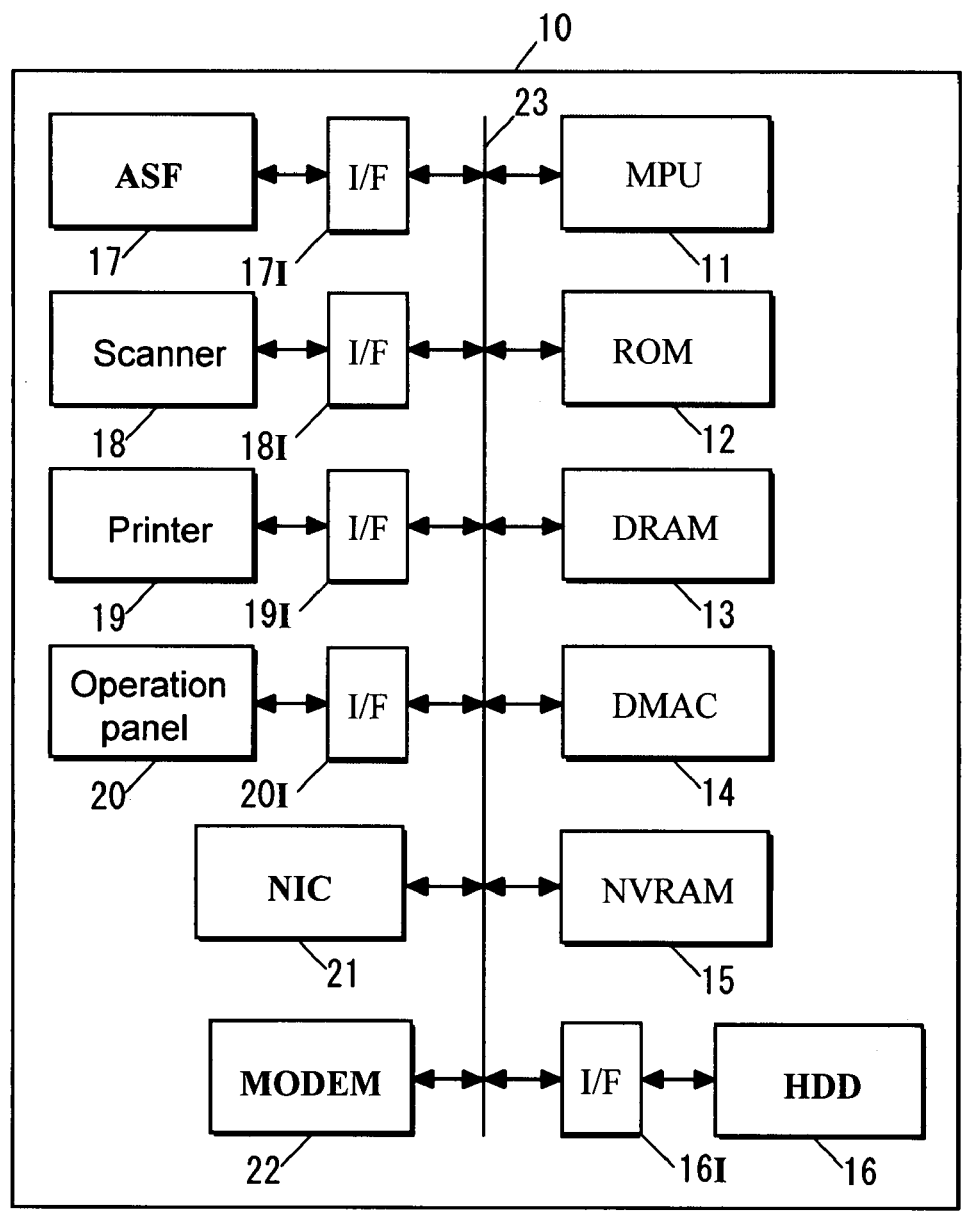
FIG. 1 is a schematic block figure of hardware of an image forming device relating to a preferred embodiment of the present invention.

FIG. 1 is a schematic block diagram of an image forming device 10 relating to a preferred embodiment of the present invention.

In the image forming device 10, an MPU 1, a ROM (read-only memory) 12; a DRAM (dynamic random access memory) 13, a DMAC (direct memory access controller) 14, a NVRAM (nonvolatile memory) 15, interfaces 161, 171, 181, 191, and 201, a NIC (network interface card) 21 and a modem 22 are connected to each other through a bus 23. A HDD (hard disk drive) 16, an auto-sheet feeder 17, a scanner 18, a printer 19, and an operational panel 20 are connected to the interfaces 161, 171, 181, and 201, respectively.

The ROM 12 stores a bootstrap loader and a BIOS (Basic Input/Output System) program. The DRAM 13 functions as a main memory. The NVRAM 15 is, for instance, a flash memory, and stores a default, a part of which is modified through operations on the operational panel 20.

Figure 2:
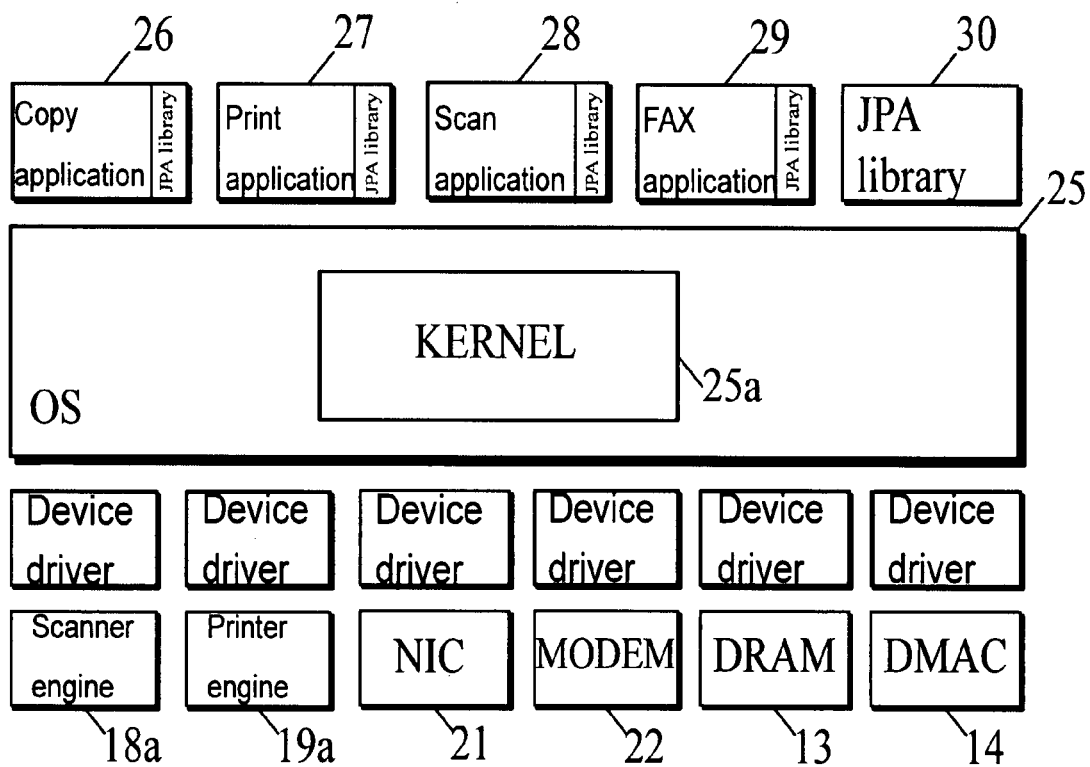
FIG. 2 is a block diagram illustrating a layered structure of software stored in the hard disk drive.

As illustrated in FIG. 2, the HDD 16 stores an OS 25 (including a kernel 25a which enables execution of multiple jobs) in the multiple virtual memory system, a copy application 26, a print application 27, a scanner application 28, and a facsimile application 29, a JPA library 30 used as a part of the applications 26 through 29—operating on a layer higher than that of the OS 25, and multiple types of device drivers operating on a layer lower than that of the OS 25. The device divers include the ones for a scanner engine 18a, a printer engine 19a, the NIC 21, the modem 22, the DRAM 13, and the DMAC 14. The HDD 16 is also used as data memory.

The scanner 18, as shown in FIG. 1, inputs images while working along with the auto sheet feeder 17, and is used for a copy and facsimile transmission job. The printer 19 includes a printer engine, a fuser unit, a paper input unit, a paper transportation unit, and a paper output unit. The printer 19 forms, based on bitmap data provided as print data, an electrostatic latent image on a photo sensitive drum of the printer engine, develops the image with a toner, transfers and fuses the developed image onto a paper, and ejects the paper. The operational panel 20 comprises a touch panel, a hardware keys, and others, and functions for receiving configuration data and instructions and displaying a selection window, a configuration window, and so forth. The NIC 21 is connected to an external host computer on a network to be used for a print job. The modem 22 is used for facsimile transmission.

The DMAC 14 transfers scanned data from the scanner interface 18I to the DRAM 13, in response to an order from the application through the kernel 25a and the device driver, and transfers data in the DRAM 13 to the printer interface 19I, print data from the NIC 21 to the DRAM 13, and facsimile transmit and receive data between the modem 22 and the DRAM 13.

Figure 3:
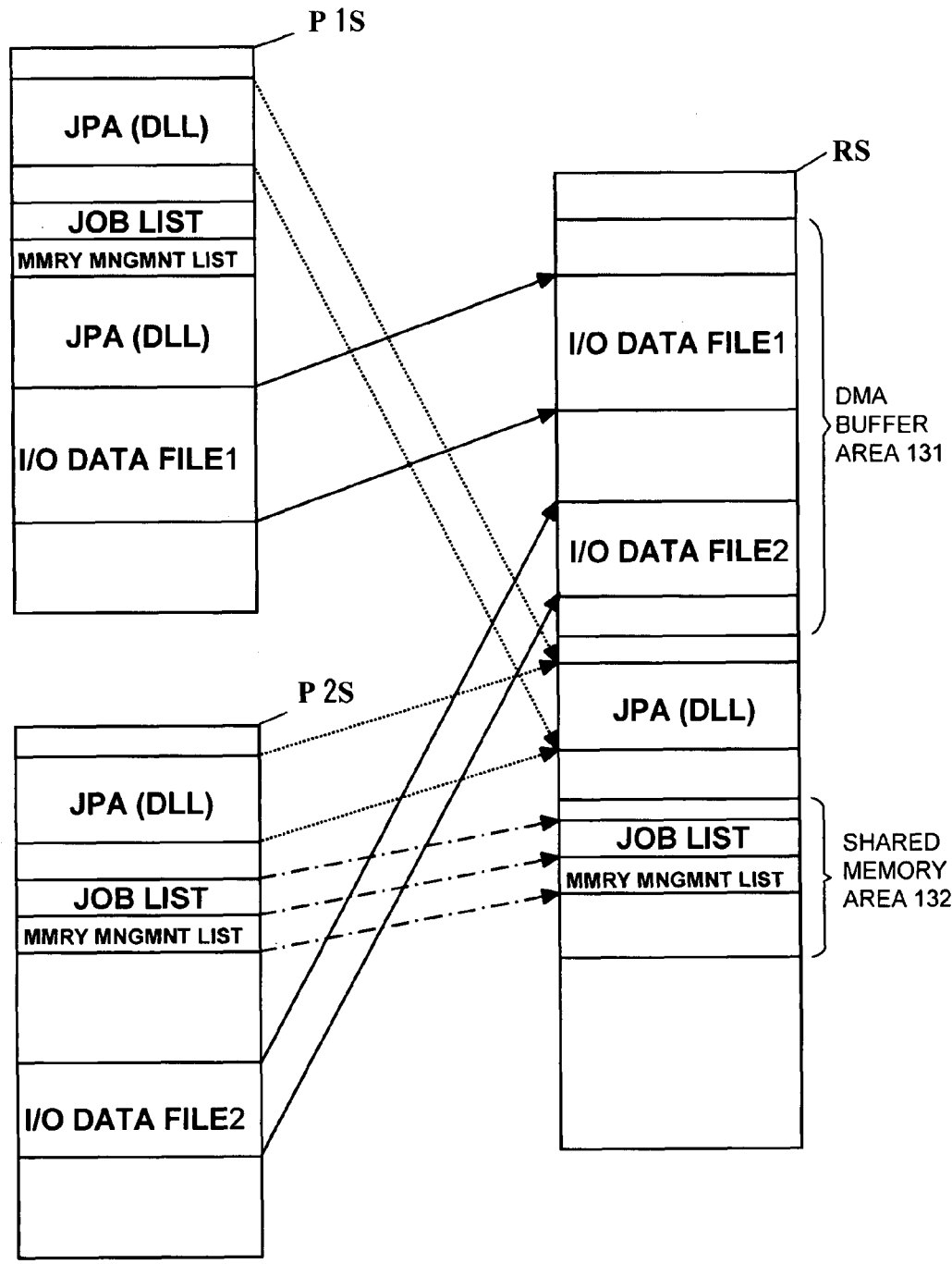
FIG. 3 is a diagram illustrating a relationship between a virtual address space of a process (or "process space") of a job, a process space of another job, and a real address space onto which a part of the former and the latter process spaces is mapped.

FIG. 3 indicates a relationship between a virtual address space P1S of a process (process space) of a given job, a process space P2S of another job, and a real address space RS onto which a part of such virtual spaces is mapped.

For example, a copy job 26J comprises the image input process of the scanner engine 18a and the image output process of the printer engine 19a, and a print job 27J comprises the image input process of the NIC 21 and the image output process of the printer engine 19a. The process P1S is, for example, an address space of the image input process of the copy job 26J, and the process space P2S is the one of the print job 27J.

A DMA buffer area 131 in the real address space PS can be accessed by providing a command provided to the DMAC 14 from the kernel 25a through the DMA device driver, or by providing a command provided to the MPU 11 from the kernel 25a through the memory driver. The latter access is enabled by mapping an I/O (input/output) data file 1 in the process space P1S and an I/O data file 2 in the process space P2S onto the real address space RS. The mapping eliminates copying data in the DMA buffer area 131 to the data area allocated for each process in the real address space RS (not shown) and processing it, and thereby helps achieving high speed processing and low memory usage.

However, arbitrary requests to the kernel 25a by each process for memory allocation, increases job wait, and the kernel cannot efficiently perform multiple jobs. Placing a middleware to mediate memory allocation requests from each job in between the OS 25 and an application, i.e. expanding the platform, will make it impossible to use existing software assets and complicate the configuration by adding an extra layer.

Therefore, the preferred embodiments of the present invention, as illustrated in FIG. 2, comprise the JPA libraries 30. The JPA libraries are used for the applications 26 through 29, respectively, and thereby each application manages its memory in the DMA buffer area 131 and implements the mediation. For each application to manage memory allocation in relation to its own and others' job states and memory allocation status in the DMA buffer area 131, a pair of a job list 31 and a memory management list 32 of the same content for different spaces are provided in each process space, and they are mapped onto a single area in the shared area in the real address space RS.

Additionally, the JPA library 30 is configured with a dynamic link library (DLL), so that JPA libraries allocated on different areas in the process space P1S and the process space P2S can be mapped onto a single area, thereby lowering the memory usage.

The job assurance library 30 includes the following functions among others.

The function1 is a function that calculates a memory size in a shared memory area 132 required to process one page of non-compressed data for the job.

The function 2 is a function that generates the job list 31 and the memory management list 32.

The function 3 is a function that determines, based on contents of the job list 31 and the memory management list 32, memory size equal to or less than one page of non-compressed data to be allocated for the job.

The function 4 is a function that requests, based on contents of the job list 31 and the memory management list 32, the kernel 25a to allocate an area in the DMA buffer area 131 and that accordingly updates the contents of the job list 31 and the memory management 32.

The function 5 is a function that requests the kernel 25a to release the allocated memory area in the DMA buffer area 131 and that deletes the job data block in the job list 31 and the job management list 32 through the kernel 25a.

Allocation of data area in the DMA buffer area 131 is required when image input data from the scanner 18, the NIC 21, or the modem 22 needs to be transferred to the DMA buffer area 131 by DMA. Although the data is compressed and the compression ratio varies, an execution of the job can be assured by obtaining one page of a non-compressed data area in advance and using it for each page. For example, the scanner 18 executes a printing job by decompressing compressed image data-read into the DMA buffer area 131 and transferring the data per band unit to the printer 19 by DMA.

Each job executes the functions 1, 2, and 3 upon the start of the job, and regularly executes the function 4, for example, per 100 millisecond. At the time of job completion, for instance, when the copy job 26J completes providing bitmap data to the printer engine 19a, the job executes the function 5.

Figure 4:
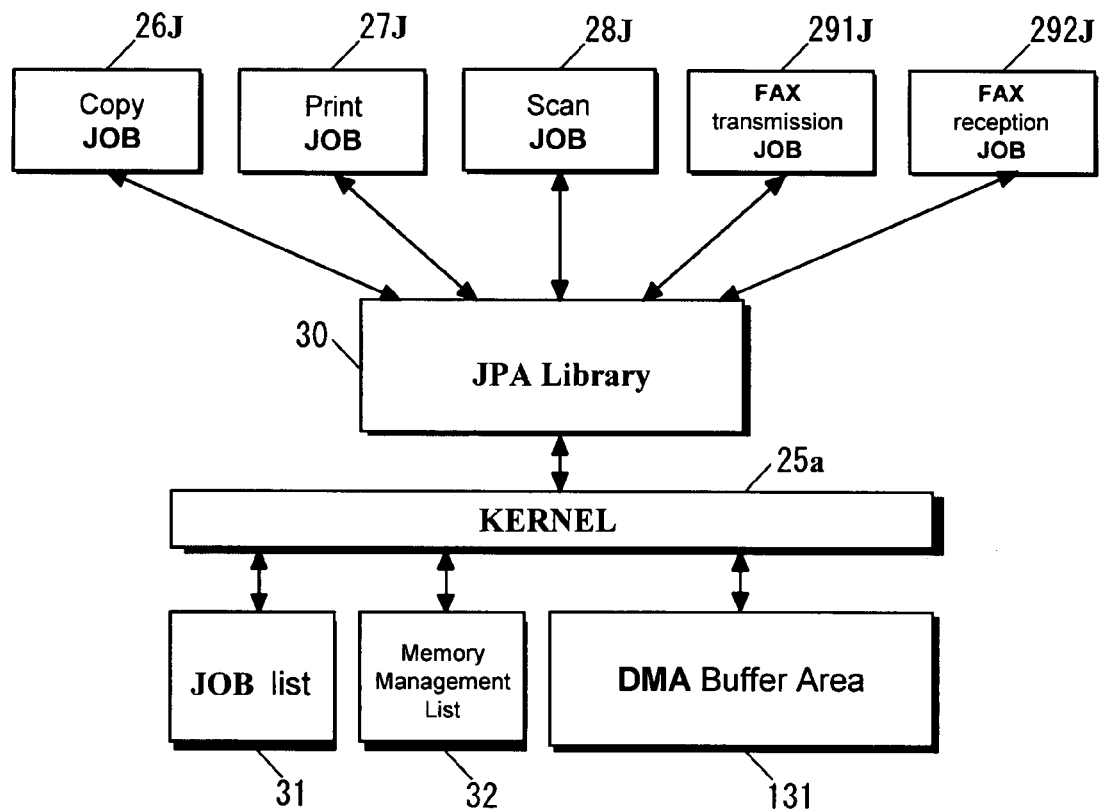
FIG. 4 is a block diagram illustrating input and output processes of a JPA library in FIG. 2.

As illustrated in FIG. 4, such configuration enables the JPA library 30 to function as though it were a middleware independent of each application. In the preferred embodiments of the present invention, the JPA library 30, in a practical sense, requests the kernel 25a to appropriately allocate an area in the DMA buffer area 131 in response to requests from each job.

Figure 5A:
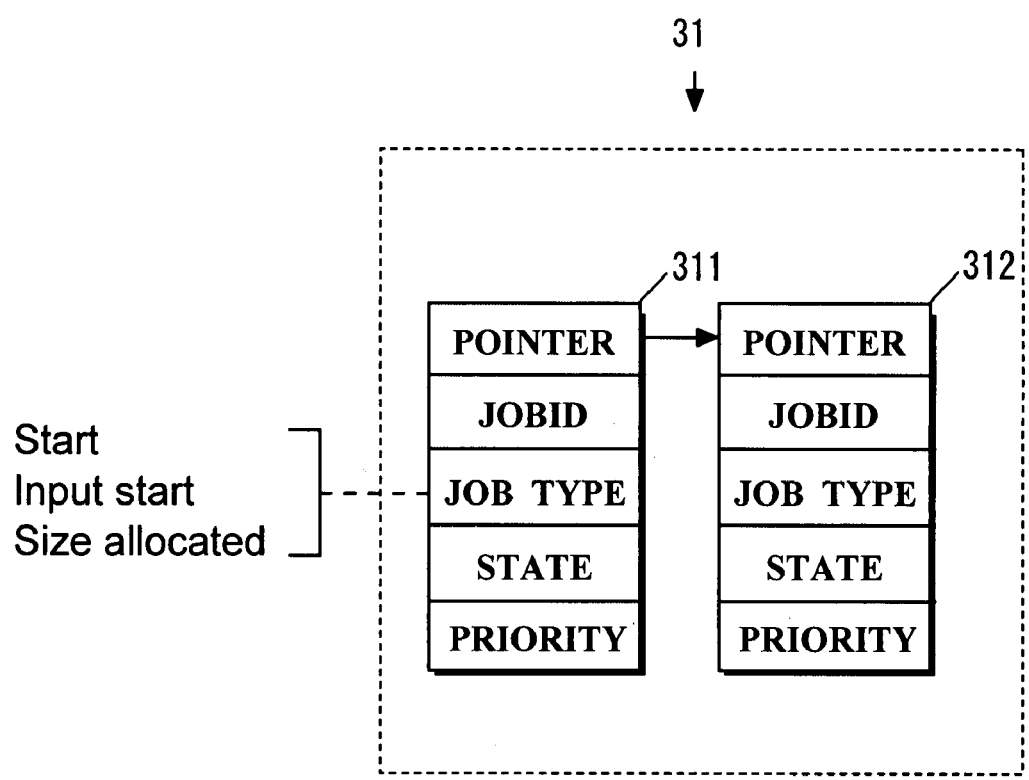
FIG. 5A and FIG. 5B are schematic configuration diagrams of a job list and a memory management list, respectively.

FIG. 5A illustrates a configuration of the job list 31.

The job list 31 comprises a list configuration in which multiple data blocks are linked to each other by pointers. Upon generation of a job, the job generates a data block 311 through the JPA library of the job. Then when a job that operates in parallel with the data block 311 is generated, the job generates a data block 312 linked to the data block 311 through the JPA library.

Each data block includes pointer data pointing to the head address of data block following the data block. ID data of the job having generated the data block, job type (copying, printing, and others) data, job state data, and job priority data.

The job state is described by "0", "1", and "2" indicating the initial stage, the input start, and the size being allocated, respectively. The state will be "0" when the data block is created or at the start of a job, "1" just before an image input of the job starts, and "2" when a required size is allocated for the job. The rule of the priority order is to prioritize a job according to the order of execution start time from earliest to latest, and as an exception, to prioritize an interruption job. It can also be configured to prioritize a job according to the order of predicted value of processing time from shortest to longest.

Figure 5B:
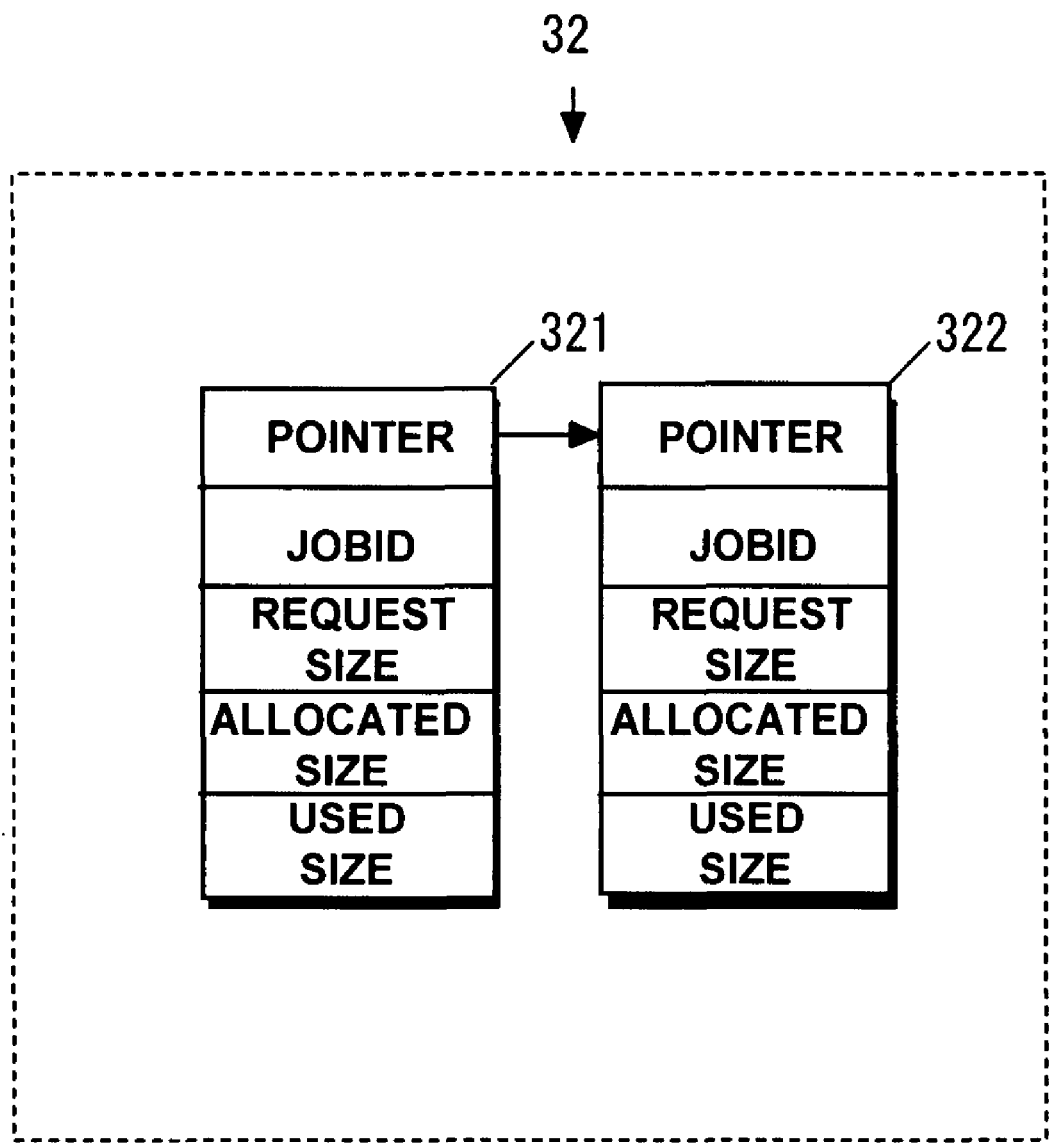

FIG. 5B is a configuration example of the memory management list 32.

Similar to the job list 31, the memory management list 32 includes a list configuration in which multiple data blocks are linked to each other by pointers. Upon generation of a job, the job generates a data block 321 (the allocated page size and the other information described hereinafter are not entered) through its JPA library. Then, when a job to operate in parallel with the data block 321 is generated, the job generates a data block 322 linked to the data block 321 (the allocated page size and other information described hereinafter are not entered) through the JPA library of the job.

Each data block includes pointer data pointing to the head address of a data block following the data block. ID data of the job having generated the data block, an area size of one page non-compressed job data in the DMA buffer area 131, which is required for executing the job, the area size data in the DMA buffer area 131, allocated through the kernel 25a, and an area size data, currently in use, in the DMA buffer area 131. The sizes are measured by page, and one page is, for example, 8 kilobyte.

One page memory size of non-compressed job data memory in the DMA buffer area 131, which is the required size for a job, is determined at the start of a job, based on the job type and the parameters such as the document size and the dpi value configured for image input processing of the job.

Figure 6:
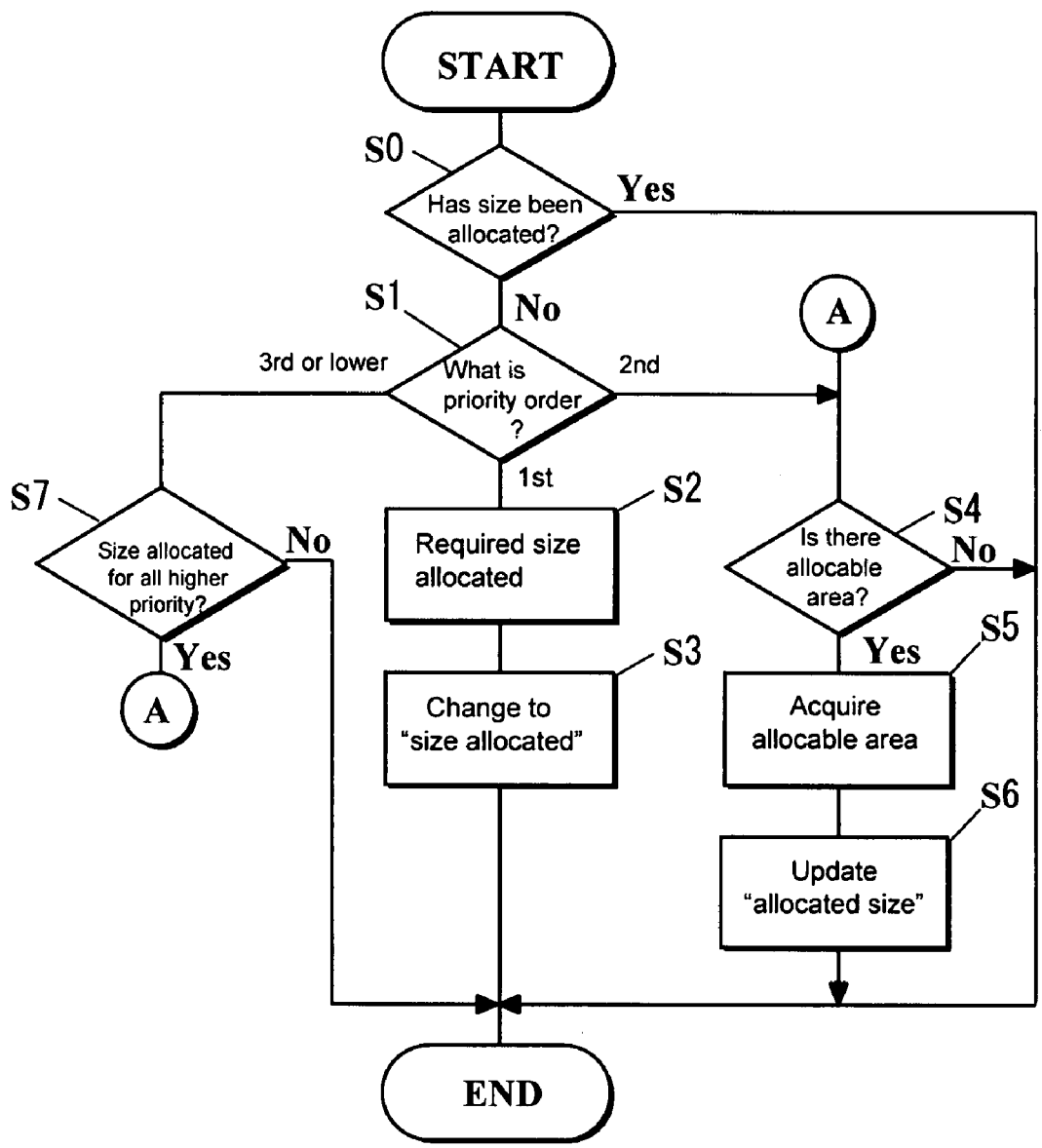
FIG. 6 is a schematic flowchart illustrating a function processing for requesting the kernel to allocate an area in a DMA (direct memory access) buffer area through the kernel, based on contents of the job list and the memory management list, and as a response, modifying contents of the job list and the memory management list accordingly.

FIG. 6 is a schematic flowchart describing a process of the function 4 to be executed by a job.

In step S0, if the job state field (of a job executing its JPA library) in the job list 31 indicates that the required size has been allocated, the processing described in FIG. 6 will be completed.

In step S1, if the job priority of a job for each job ID is the first, the second, and equal to or later than the third, operation moves to steps S2, S4, and S7, respectively.

In step S2, since the job priority is the highest, the required size area (one page of non-compressed data for the job) is allocated by requesting the kernel 25a.

In step S3, the job state in the job state field in the job list 31 is altered to the state of "the size being allocated", and the requested size is entered in the allocated size field in the memory management list 32 to complete the processing of FIG. 4.

In step S4, the memory management list 32 is examined to find out if the DMA buffer area 131 includes an allocatable area. If it does, the area is allocated in step S5, and the size is entered in the job allocation size field in the memory management list 32 in step S6. If the required size is allocated through this processing, the job state field of the job in the job list 31 is altered to the state of "the size being allocated", and the processing of FIG. 6 completes. From the memory management list 32, a memory area in the DMA buffer area 131 can not be allocated, but when an image input process job, such as facsimile transmission, needs to be executed, a memory area outside of the DMA buffer area 131 is allocated. In this case, the MPU 11 executes data transmission to the memory.

In step S7, if all the jobs whose priority is higher than the job are in the state of "the requested size being allocated", the processing moves to step S4.

It should be noted that FIG. 6 does not show the process at the generation of a job for the sake of simplification. Upon creation of a third priority job, the job list 31 is examined. If a job of the second priority has not yet allocated one page of non-compressed data memory in the DMA buffer area 131 as well as the DMA buffer area 131 has an unused area, the second priority job is allocated to the unused area.

The preferred embodiments of the present invention includes in the real address area RS the DMA buffer area 131 onto which data area in each virtual address space of an executing process is mapped and to which kernel 25a of the operating system 25 can make access and the shared memory area 132 where the job list 31 which indicates a state of each executing job and the job management list 32 which indicates an area allocated status in the DMA buffer area 131 for each executing job are stored. Processes in the virtual address spaces have identical JPA programs. Each of the JPA programs includes a step (a), based on the job list 31 and the job management list 32, of determining a memory size of an area to which one page of non-compressed data in the DMA buffer area 131 for the job is allocated, which is to be requested to the kernel 25a, a step (b) of requesting the kernel 25a to allocate the size area and altering the content in the job management list 32 accordingly, and a step (c), in response to a job output completion report, requesting the kernel 25a to release the allocated area in the DMA buffer area 131 for the job and altering the content in the DMA buffer area 131 accordingly. This embodiment achieves a simple configuration without a middleware and efficient memory sharing between processes and a kernel in a multiple processes configuration.

Furthermore, an image data input to the DMA buffer area 131 in the kernel address space by direct memory access can be efficiently processed, without copying the data into a process space, by each of the processes.

The present document incorporates by reference the contents of Japanese priority document, Japanese Patent Application No. 2006-133649, filed in Japan on May 12, 2006.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. An image forming device having a processor, multiple image input units connected to the processor, and a storing unit connected to the processor and embodying a virtual address spaces and a real address space, wherein an operating system that executes multiple jobs by mapping a virtual address space of a process of each job onto a real address space being stored in the storing unit, the image forming device, comprising:
   a first shared area onto which a data area in each virtual address space of an executing process is mapped and to which a kernel of the operating system can make access;
   a second shared area where state information of each executing job and an area allocation status information of each executing job in the first shared area are stored, wherein the real address space includes the first shared area and the second shared area; and
   identical job page assurance programs, wherein processes in the virtual address spaces have the identical job page assurance programs; and
   the job page assurance programs, further comprising steps of:
   (a) determining a memory size of an area to which one page of non-compressed data for a job is allocated in the first shared area, which is to be requested to the kernel, based on the state information and the area allocation status information of the job;
   (b) requesting the kernel to allocate the area of the size and altering the area allocation status information; and
   (c) requesting the kernel to release the allocated area for the job in the first shared area and altering the area acquisition status information, in response to an output completion report of the job.

2. The image forming device of claim 1, wherein:
the first shared area is a direct memory access buffer area in a kernel address space.

3. The image forming device of claim 2, wherein:
the job state data includes a job ID and state information of each job corresponding to the job ID, and the memory management data includes a job ID, a memory size required for execution of each job in the first shared area, and a memory size allocated for the job in the first shared area, the memory size corresponding to the job IDs;
the state information of the job includes data indicating whether or not the required size has been allocated; and
each job page assurance program further includes a step (d), in response to the job generation, of adding data for the job to the job state data and the memory management data, the job page assurance program requesting the kernel to release the allocated area, and deleting data for the job in the job state data and the memory management data in the step (c).

4. The image forming device of claim 3, wherein:
the job state data is a job list constituted by data blocks in which state information of a job and a job ID correspond to the job, and the data blocks are linked to each other for each job; and
the memory management data is a memory management list constituted by data blocks in which a memory size allocated for a job in the first shared area and a job ID corresponds to the job ID, the data blocks are linked to each other for each job.

5. The image forming device of claim 3, wherein:
the state information includes a priority order in the order of a job execution starting time from earliest to latest; and
if the job priority is primary, the job page assurance program requests the kernel to allocate one page of non-compressed data area in the first shared area, and if the job priority is secondary, upon creation of a third priority job, the job page assurance program requests the kernel to allocate the rest of non-compressed job data area of equal to or less than one page in the first shared area.

6. The image forming device of claim 4, wherein:
the state information includes a priority order in the order of a job execution starting time from earliest to latest; and
if the job priority is primary, the job page assurance program requests the kernel to allocate one page of non-compressed data area in the first shared area, and if the job priority is secondary, upon creation of a third priority job, the job page assurance program requests the kernel to allocate the rest of non-compressed job data area of equal to or less than one page in the first shared area.

7. The image forming device of claim 3, further comprising:
a dynamic link library, wherein the job page assurance program is included in the dynamic link library.

8. The image forming device of claim 4, further comprising:
a dynamic link library, wherein the job page assurance program is included in the dynamic link library.

9. The image forming device of claim 5, further comprising:
a dynamic link library, wherein the job page assurance program is included in the dynamic link library.

10. The image forming device of claim 6, further comprising:
a dynamic link library, wherein the job page assurance program is included in the dynamic link library.

* * * * *